United States Patent [19]
Omi

[11] Patent Number: 4,727,778
[45] Date of Patent: Mar. 1, 1988

[54] METHOD OF MANUFACTURING OF CUTTING TOOL

[75] Inventor: Shohei Omi, Anjo, Japan

[73] Assignee: Omi Kogyo Co., Ltd., Anjo, Japan

[21] Appl. No.: 841,029

[22] Filed: Mar. 17, 1986

Related U.S. Application Data

[63] Continuation-in-part of Ser. No. 688,216, Jan. 2, 1985.

[30] Foreign Application Priority Data

Dec. 6, 1984 [JP] Japan .................................. 59-257918

[51] Int. Cl.⁴ ............................................. B23B 63/00
[52] U.S. Cl. ..................... 76/112; 76/101 R; 76/101 A
[58] Field of Search .................. 76/112, 101 R, 101 A

[56] References Cited

U.S. PATENT DOCUMENTS

| | | |
|---|---|---|
| 3,162,187 | 12/1964 | Christensen ........................... 76/112 |
| 3,736,828 | 6/1973 | Funakubo ........................... 76/101 A |
| 4,039,700 | 8/1977 | Sohmer et al. .................... 76/101 A |

OTHER PUBLICATIONS

Page 415, chapt. 9, section 2, *Mechanical Engineering Design*, Shigley & Mitchell, 1983, 4th ed., McGraw-Hill Book Co., New York.

*Primary Examiner*—Frederick R. Schmidt
*Assistant Examiner*—Maurina Rachuba
*Attorney, Agent, or Firm*—Jordan and Hamburg

[57] ABSTRACT

A method of attaching segments to the body of a cutting tool, such as a diamond saw blade, is initiated by inseparably coupling the segments to their respective interposed members by sintering. The interposed members are made of iron, cobalt, or other metal. Then, the interposed members are rigidly coupled to the body by welding or other method.

12 Claims, 16 Drawing Figures

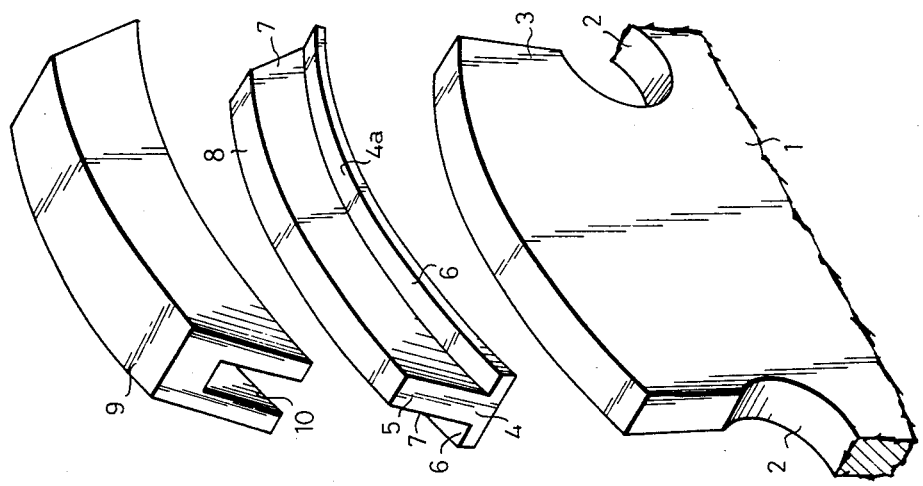
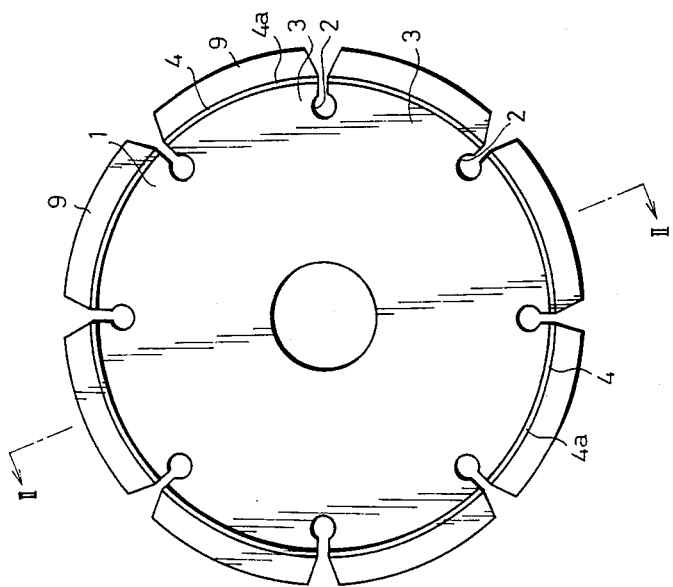

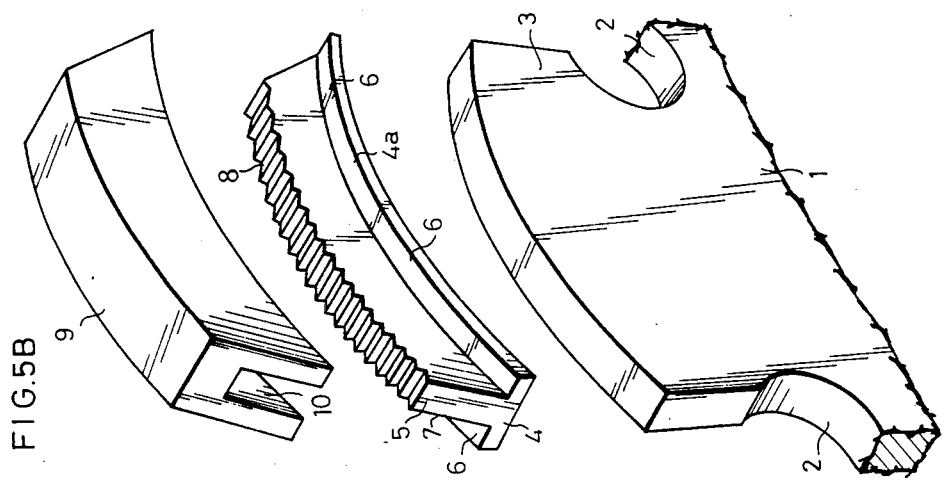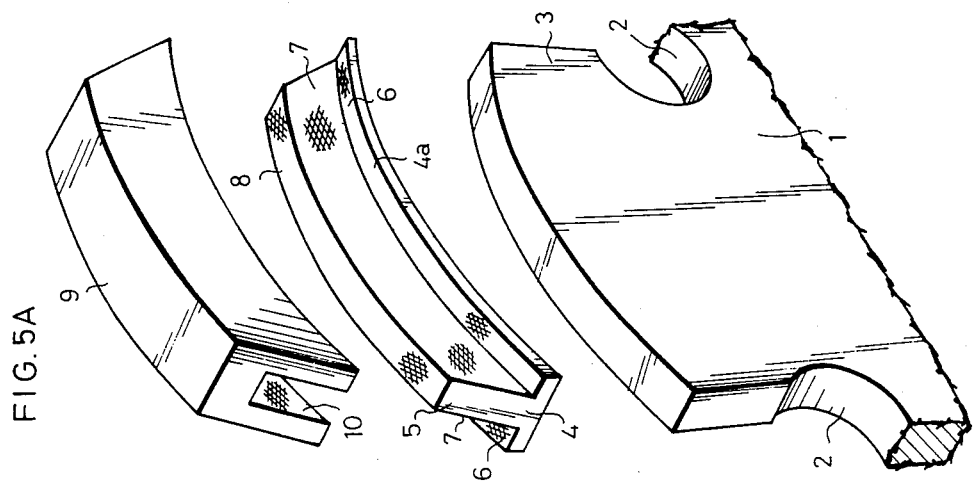

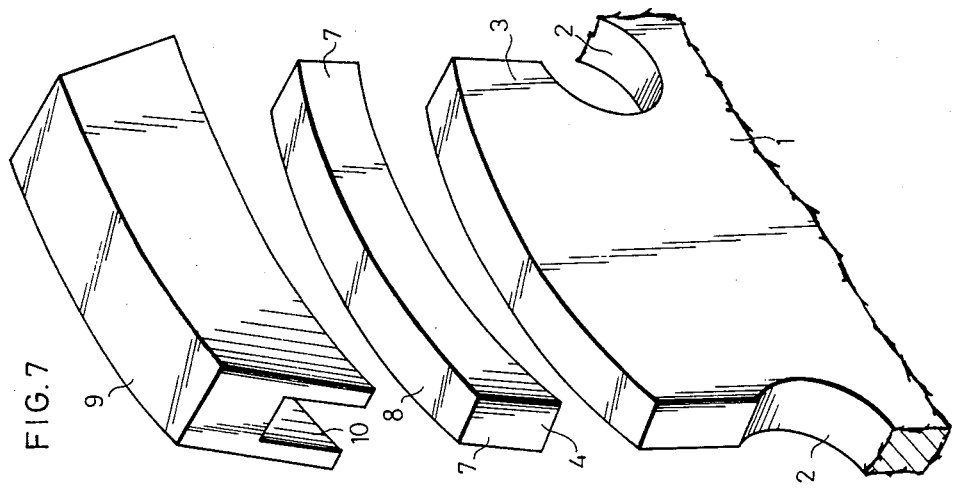
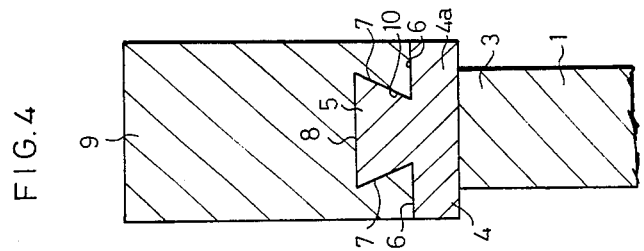
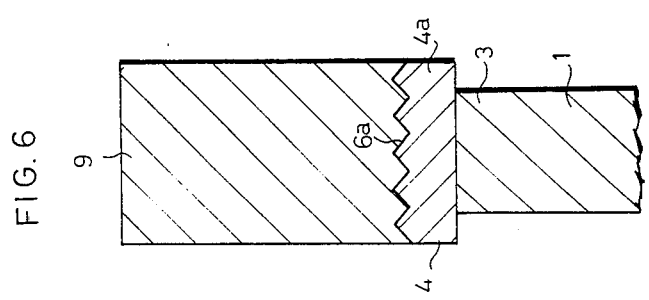

FIG. 13
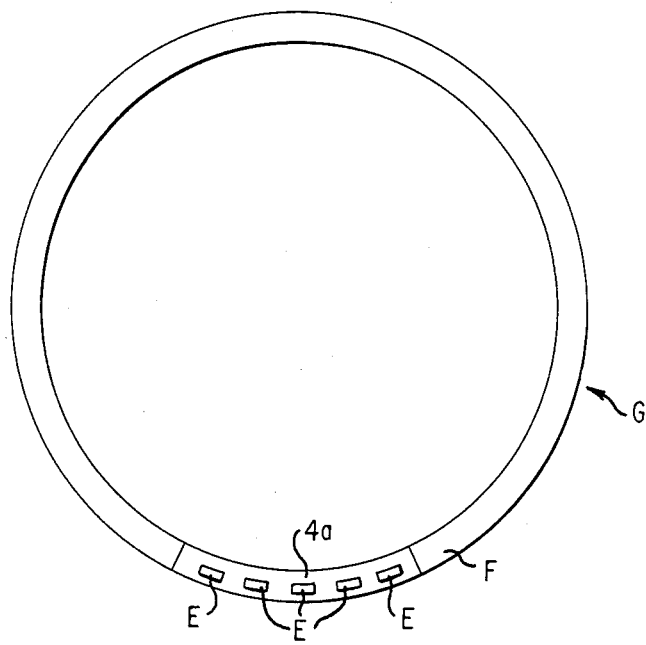
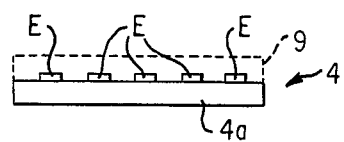
FIG. 14

METHOD OF MANUFACTURING OF CUTTING TOOL

This application is a continuation-in-part of application Ser. No. 688,216, filed 1/2/85.

FIELD OF THE INVENTION

The present invention relates to a method of manufacturing a cutting tool such as a diamond saw blade, diamond core bit, or diamond gang saw blade.

BACKGROUND OF THE INVENTION

Generally, a cutting tool, such as a diamond saw blade, comprises a body made of iron, and segments which are substantially formed of diamond dust and a bronze alloy, an alloy of cobalt, copper, or a tungsten alloy the segments being rigidily attached to the ends of the body by brazing, laser welding, sintering, or other similar means.

However, where segments are attached to the body by brazing, heat is generated due to friction when the cutting tool is in use. This softens the locations at which the segments are attached. As a result, the segments may disengage from the body.

Where segments are attached to the body by laser welding, cracking often takes place near the weld zones immediately after the welding operation, making the segments useless.

Where segments are attached to the body by sintering, if the body has been quenched, the heating during sintering releases the stress remaining in the body, thereby producing thermal stress. This may lower the cutting accuracy. Accordingly, the material of the body must be selected from limited number of substances. This may increase the cost to fabricate the body.

SUMMARY OF THE INVENTION

Accordingly, it is the object of the present invention to provide a method of manufacturing a cutting tool, the method being free of the foregoing difficulties with the conventional methods.

Specifically, according to the method of the invention, the segments are prevented from becoming damaged while the tool is in use. Further, the segments do not disengage from the body. In addition, the tool is economical to manufacture.

BRIEF DESCRIPTION OF THE DRAWINGS

FIG. 1 is a front elevation of a saw blade embodying the present invention;

FIG. 2 is a cross-sectional view taken along the line II—II of FIG. 1;

FIG. 3 is a fragmentary, exploded perspective view of the saw blade of FIG. 1, for showing the manner in which one segment is attached to the body;

FIG. 4 is a cross-sectional view of another support ridge and another groove into which the ridge is fitted;

FIGS. 5(A) and 5(B) are fragmentary, exploded perspective view of saw blades, for showing other installation surfaces to which segments are attached;

FIG. 6 is a cross-sectional view showing a further interposed member and a segment;

FIG. 7 is a view similar to FIG. 3, but showing a still other interposed member.

FIG. 13 is a bottom view of a core cutter having one saw blade thereon;

FIG. 14 is a side view of the saw blade attached to the core cutter; and

DETAILED DESCRIPTION OF THE INVENTION

Figure 8:
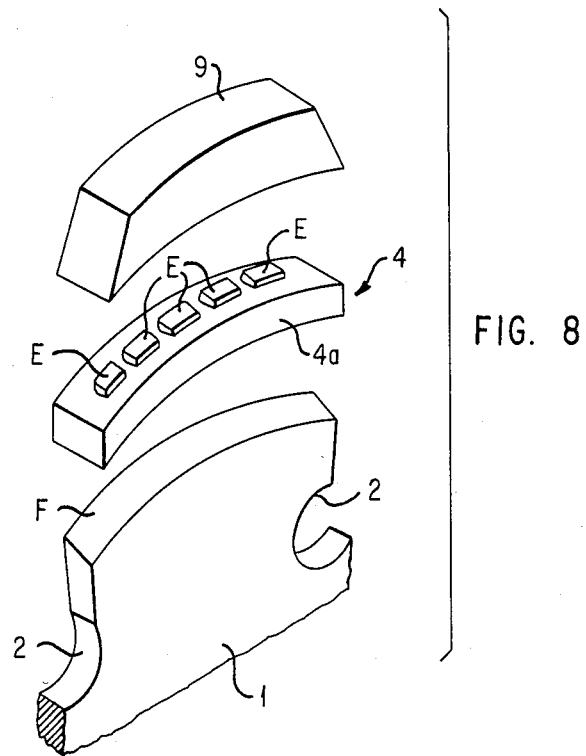
FIG. 8 is an exploded perspective view of a still another embodiment of a saw blade.

Referring to FIGS. 1, 2, and 3, there is shown a diamond saw blade. The body of this blade is indicated by numeral 1, and takes a disklike form. The body 1 is made of iron and has been quenched. A plurality of notches 2 are equally or arbitrarily spaced apart from each other circumferentially in the outer periphery of the body 1. An installation portion 3 to which an interposed member 4 is attached is formed between the respective two adjacent notches 2. Each interposed member 4 is inseparably mounted to the outer periphery of each installation portion 3 by inert-gas tungsten arc welding or laser welding. As best shown in FIG. 3, each interposed member 4 is composed of a slender plate 4a for rigid mounting and a support ridge 5 formed integrally with the plate 4a and extending on the outer surface of the plate 4a outer its whole length. The plate 4a is curved so as to correspond to the arc-shaped outer fringe of the installation portion 3 of the body 1. A pair of first installation surfaces 6 is informed on each side of the ridge 5 on the outer surface of the plate 4a. A pair of second installation surfaces 7 is formed on each side surface of the ridge 5. A third installation surface 8 is formed on the top, outer surface of the ridge 5. Each interposed member 4 is made of iron, cobalt, manganese, chromium, nickel, brass, copper, or other material. The installation surfaces 6, 7, 8 are all finished roughly.

Segments 9 are formed and at the same time firmly attached to the outer side surface of each interposed member 4. As can be seen from FIG. 2, each segment 9 is made somewhat thicker than the body 1, and is provided with a groove 10 extending along the inner side of the segment 9 over the whole length of the segment. The groove 10 is so dimensioned that the protrusion 5 of each interposed member 4 is fitted into it. Actually the protrusion 5 is firmly bonded to the segment 9 when the segment 9 is formed. Each segment 9 is made of a bronze alloy, an alloy of cobalt and copper, a tungsten alloy, or other alloy. Diamond dust has been added to the material which has been sintered. Sufficient hardness is imparted to each segment 9 to prevent it from becoming clipped while it is being machined.

Figure 9:
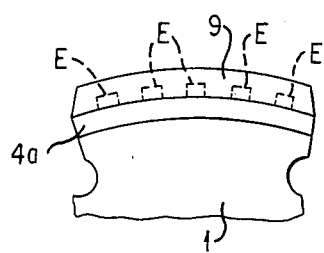
FIG. 9 is a side view of the saw blade as shown in FIG. 8.

Preferably, as shown in FIGS. 8 and 9, the interposed member 4 is provided with a plate 4a and a plurality of projections E extending upwardly from the plate 4a. The projections E are spaced apart from each other, while the projections E at the longitudinal ends on the plate 4a are also spaced from the longitudinal end surfaces of the plate 4a. If the end projection E is exposed to the end surface of the segment 9, cracking may occur in the segment 9 adjacent to the end projection. All the segments E must be located inside the segment 9.

The thickness or height of the plate 4a is, preferably, in the range between 2.5 mm and 4.0 mm. If the thickness of the plate 4a is less than 2.5 mm, welding between the body 1 and the plate 4a cannot be properly made. If the thickness of the plate 4a is more than 4.0 mm, the cutting ability decreases because the thickness of the plate 4a becomes a strong cutting resistance.

The height of the projection E is, preferably, in the range between 0.8 mm and 1.2 mm. If the height of the projection is less than 0.8 mm, the segment 9 cannot be properly retained by the projections E. If the height of the projection E is more than 1.2 mm, the projections E are exposed to the upper surface of the segments 9 when the height of the segments 9 decrease in use.

Figure 10:
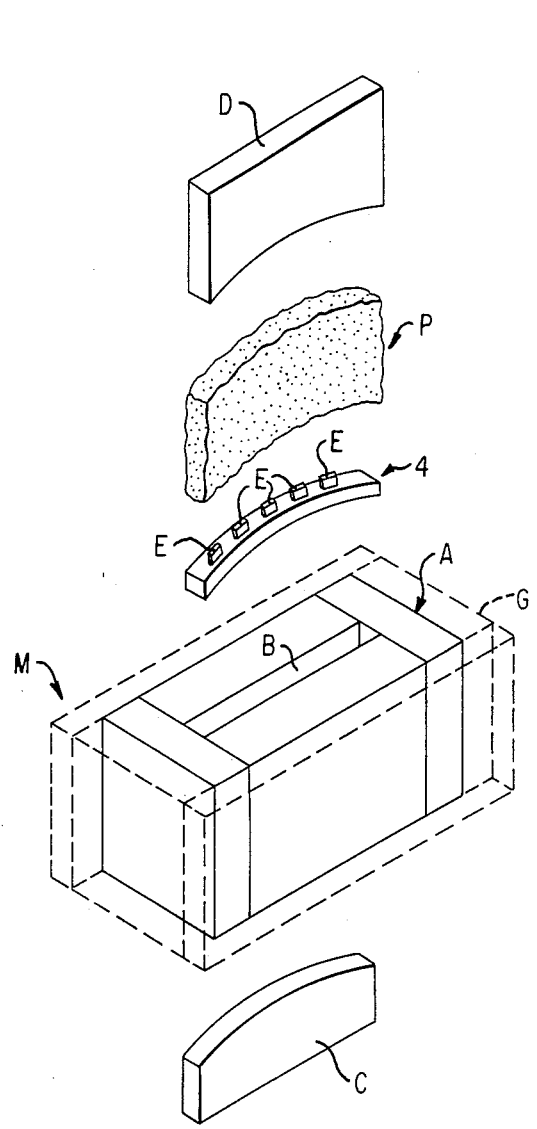
FIG. 10 is an exploded perspective view for showing a saw blade and a mold for manufacturing the saw blade.

The manner in which each segment 9 is attached to the body 1 is now described. First, diamond dust is added to powdered metal or metal compound. Then, this mixture is sintered to form each segment 9. During this sintering operation, one interposed member 4 which has been already formed is placed in contact with the inner side surface of each segment 9 to inseparably mount the segment 9 to the interposed member 4 in such a way that the support ridge 5 of the member 4 is fitted in the groove 10 in the segment 9. In particular, when the segment 9 is formed and at the same time attached to the interposed member 4, a mold M as shown in FIG. 10 is used. The mold M comprises four side plates A, a bottom plate C and an upper plate D, which are made of graphite. The side plates A are placed in a metal case G.

When the segment 9 is formed, the interposed member 4 prepared already is placed in a space B of the side plates A, the member 4 being located above the bottom plate C. The width and length of the space B are exactly the same as those of the interposed member 4. Thereafter, powdered metal P with diamond dust is put in the space B above the interposed member 4, and the upper plate D is placed on the mold M.

Figures 11, 12:
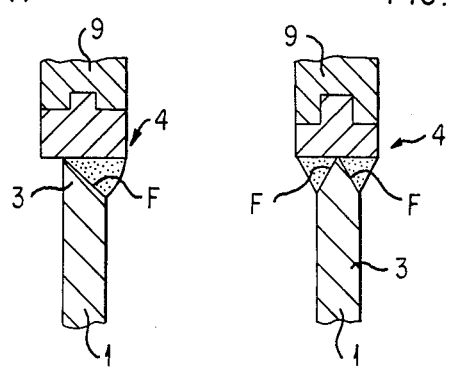
FIG. 11 is a section view for showing one example of the attachment of the interposed member to the body.
FIG. 12 is a section view for showing another example of the attachment of the interposed member to the body.

High pressure is applied between the upper and bottom plates D, C, while at the same time electricity is supplied to the interposed member 4 and the powdered metal P to generate heat by electricity. The powdered metal P is pressed and sintered (in a sintering press), so that the segment 9 is formed and at the same time firmly attached to the interposed member 4. Electric power for sintering is 30 KVA and 2500–3500 A. The temperature at which the powdered metal or metal compound is heated during the sintering operation varies from material to material. When the material is a bronze alloy, the temperature is approximately 650° C. When it is a cobalt alloy, the temperature ranges from about 750° C. to 950° C. When it is a tungsten alloy, the temperature is roughly equal to 1040° C. After mounting the segments 9 to the interposed members 4 as described above, the inner side surface of each member 4 is rigidly fixed to the outer periphery of the body 1 by inert-gas tungsten arc welding, inert gas arc welding using a consumable electrode, laser welding, or other process. When the interposed member 4 with the segment 9 thereon is fixed to the body 1, the outer periphery of the body 1 is shaped so that one inclined attaching surface F (FIG. 11) or two inclined attaching surfaces F (FIG. 12) are formed. In case two inclined attaching surfaces F are formed, welding must be performed from two sides of the body 1. However, in case one inclined attaching surface F is formed on the body 1, welding may be performed from one side of the body 1.

In this diamond saw blade, the segments 9 are fastened to the interposed members 4 by sintering and then the members 4 are welded to the body 1. Therefore, it is unlikely that the stress remaining inside of the body 1 is released by the heating during sintering, thereby deforming the body 1. Also, since the segments 9 are not directly attached to the body 1, cracking does not take place in heat-affected zones in the segments 9. In addition, since the segments 9 are joined to the interposed member 4 by sintering, there exists no possibility that the joined portions are molten by the heat produced when the saw blade is in use. Consequently, the segments 9 are prevented from coming off the interposed members 4. Furthermore, as the installation surfaces 6–8 on the interposed members 4 are made rough, these surfaces are in contact with the segments 9 with increased area of contact. This ensures that the segments 9 are rigidly joined to the interposed members 4 by means of sintering.

It is to be understood that the present invention is not limited to the above-mentioned embodiment, but rather various modifications and changes may be made without departing from the spirit and scope of the invention as follows.

(1) Referring to FIG. 4, each support ridge 5 of the interposed members 4 may be shaped into a dovetailed form in cross section and each groove 10 of the segment 9 may be shaped into the corresponding form in cross section so that the segments 9 may be more rigidly fastened to the interposed members 4.

(2) At least one of the three kinds of installation surfaces 6, 7, and 8 of the interposed members 4 may be knurled, as shown in FIG. 5(A), or serrated, as shown in FIG. 5(B). Also, the surfaces of the segments 9 with which the machined ones of the installation surfaces 6–8 make contact may be knurled or serrated.

(3) Referring to FIG. 6, the support ridge 5 of the interposed members 4 may be omitted. Instead, the outer surface of each plate 4a for rigid coupling may be serrated to form an installation surface 6a. Also, each groove 10 in the segments 9 may be omitted, and the inner side surface may be serrated. This ensures sintering and facilitates the manufacture of the interposed members 4.

(4) Referring to FIG. 7, each interposed member 4 may be shaped into a simple rectangular pillar so that the whole member 4 can be received in the groove 10 in each segment 9. This contributes to simplification of the structure.

(5) The invention is not limited to diamond saw blades, but rather it may also be applied to other diamond cutting tools, such as diamond core bits, or diamond gang saw blades, or to segments for carbide tools other than diamond cutting tools.

Figure 15:
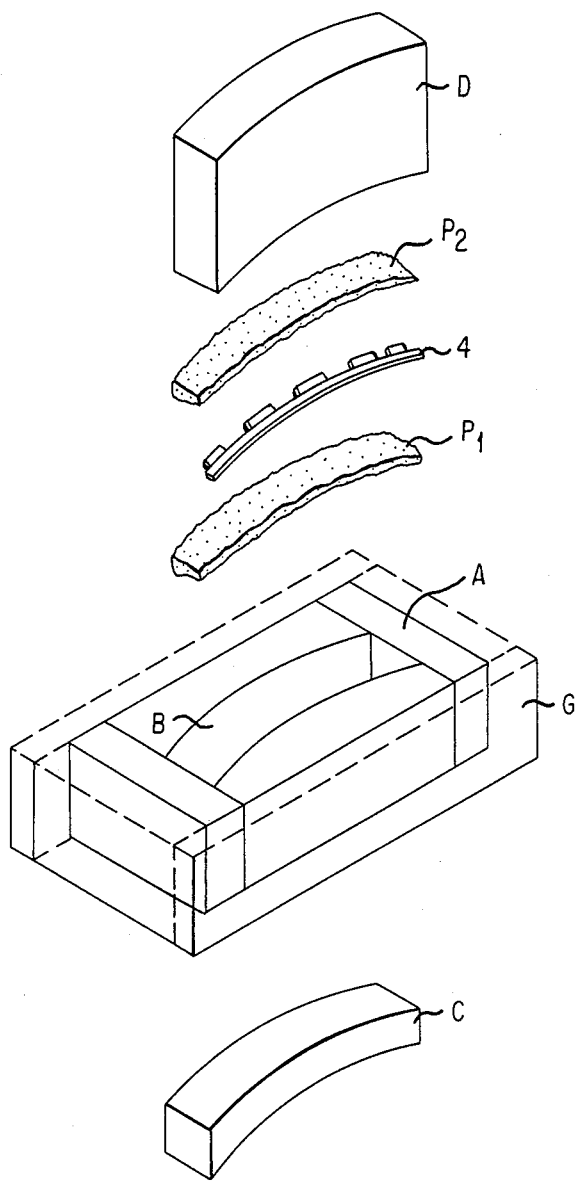
FIG. 15 is an exploded perspective view for showing a saw blade for the core cutter and a mold for manufacturing the same.

FIG. 13 shows that one interposed member 4 with the segment 9 is attached to a core cutter G. The interposed member 4 to be used as a core cutter G is curved along the circumference of the cutter G, but the structure thereof is the same as the structure used for the saw blade. When the interposed member 4 with the segment 9 used for the core cutter is manufactured, the interposed member 4 is placed in a space B surrounded by the side plates A, as shown in FIG. 15, wherein the powdered metal $P_1$ and $P_2$ with diamond dust is placed above and below the member 4. Then, the upper and bottom plates D and C are pressurized and heat is supplied by electricity. The interposed member thus formed is welded to the body of the core cutter as usual.

As described in detail thus far, the present invention prevents the body of a saw blade or the like from being deformed when segments are mounted to it. Also, it is unlikely that the segments come off the body or become damaged when the blade is in use. Further, the blade is relatively cheap to manufacture.

What is claimed is:

1. A method of manufacturing cutting tools, comprising:
    preparing a body of a cutting tool having a plurality of installation portions, each installation portion having an inclined surface at an outer periphery thereof extending substantially across thickness of the body;
    preparing a plurality of interposed members, each interposed member including a plate portion having a circumferential upper surface, longitudinal ends, and a plurality of projections extending upwardly from the plate portion, said projections being arranged on the circumferential upper surface, along the longitudinal direction of the plate portion and spaced apart from each other, two of said projections located adjacent to the respective longitudinal ends of the plate portion being spaced from the respective longitudinal ends of the plate portion so that any portions of the projections are not coplanar with the longitudinal ends of the plate portion and are located completely away therefrom;
    preparing a mold having a space so that width thereof is substantially the same as width of the interposed member;
    placing the interposed member into the mold and disposing metal powder with diamond dust in the space of the mold so that at least the space adjacent the projections is completely filled with the metal powder with diamond dust;
    heating and pressurizing the metal powder with diamond dust so that a cutting segment is formed by the metal with diamond dust and is firmly fixed onto the interposed member to completely cover the projections to thereby prevent possibility of cracks occurring on the cutting segment; and
    welding the interposed members with the cutting segments onto the body of the cutting tool from a side of the body of the cutting tool with the inclined surface.

2. A method of manufacturing cutting tools according to claim 1, in which said mold includes first and second molding members slidably situated inside the space.

3. A method of manufacturing cutting tools according to claim 2, in which said heating process is performed by applying electricity between the first and second molding members, and said pressurizing process is performed by applying pressure against the first and second molding members.

4. A method of manufacturing cutting tools according to claim 3, in which electric power applied for sintering is about 30 KVA and cutting thereof is about 2,500-3,500 A.

5. A method of manufacturing cutting tools according to claim 1, in which said metal powder is selected from the group consisting of a bronze alloy powder, a cobalt alloy powder and a tungsten alloy powder, and sintering temperature of the bronze alloy powder, cobalt alloy powder and tungsten alloy powder is about 650 degrees Centigrade, 750-950 degrees Centigrade and 1,040 degrees Centigrade, respectively.

6. A method of manufacturing cutting tools according to claim 1, in which thickness or height of the interposed member is between 2.5-4.0 mm, and height of the projection is between 0.8-1.2 mm.

7. A method of manufacturing cutting tools according to claim 1, in which said body is quenched.

8. A method of manufacturing cutting tools according to claim 7, in which said body is a circular saw blade.

9. A method of manufacturing cutting tools according to claim 7, in which said body is a core cutter.

10. A method of manufacturing cutting tools, comprising:
    preparing a circular body of a cutting tool having a plurality of installation portions, each installation portion having an inclined surface at an outer periphery thereof extending substantially across thickness of the body;
    preparing a plurality of interposed members, each interposed member including a plate portion having a circumferential upper surface, longitudinal ends, and a plurality of projections extending upwardly from the plate portion, said projections being arranged on the circumferential upper surface, along the longitudinal direction of the plate portion and spaced apart from each other, two of said projections located adjacent to the respective longitudinal ends of the plate portion being spaced from the respective longitudinal ends of the plate portion so that any portions of the projections are not coplanar with the longitudinal ends of the plate portion and are located completely therefrom, thickness or height of the interposed member being between 2.5-4.0 mm and height of the projection being between 0.8-1.2 mm;
    preparing a mold having a space so that width thereof is substantially the same as width of the interposed member, said mold including first and second molding members slidably situated inside the space;
    disposing the interposed member in the space of the mold;
    disposing metal powder with diamond dust in the space of the mold so that at least the space adjacent the projections is completely filled with the metal powder with the diamond dust;
    heating the metal powder with diamond dust by applying electricity between the first and second molding members and pressurizing the metal powder toward the interposed member by applying pressure against the first and second molding members so that a cutting segment is formed by the metal with diamond dust and is firmly fixed onto the interposed member to completely cover the projections to thereby prevent possibility of cracks occurring on the cutting segment;
    disposing the interposed members with the cutting segments adjacent the inclined surfaces of the installation portions along the radial direction of the circular body; and
    welding the interposed members with the cutting segments onto the inclined surfaces of the body of the cutting tool so that the interposed members are welded to the body from a side of the body of the cutting tool with the inclined surface.

11. A method of manufacturing cutting tools according to claim 10 in which electric power applied for sintering is about 30 KVA and current thereof is about 2,500–3,500 A.

12. A method of manufacturing cutting tools according to claim 11, in which said metal powder is selected from the group consisting of a bronze alloy powder, a cobalt alloy powder and a tungsten alloy powder, and sintering temperature of the bronze alloy powder, cobalt alloy powder and tungsten alloy powder is about 650 degrees Centigrade, 750–950 degrees Centigrade and 1,040 degrees Centigrade, respectively.

* * * * *